United States Patent

[11] 3,584,972

| [72] | Inventors | Nick F. Bratkovich;<br>George B. Meginnis, both of Indianapolis, Ind. |
|---|---|---|
| [21] | Appl. No. | 526,207 |
| [22] | Filed | Feb. 9, 1966 |
| [45] | Patented | June 15, 1971 |
| [73] | Assignee | General Motors Corporation<br>Detroit, Mich. |

[54] LAMINATED POROUS METAL
27 Claims, 13 Drawing Figs.

[52] U.S. Cl. .................................................. 416/229,
29/156.8 B, 29/191
[51] Int. Cl. ...................................................... B64c 27/46
[50] Field of Search .......................................... 29/156.8,
182.1, 183, 191, 191.2, 194, 198; 244/125, 126;
416/229

[56] References Cited
UNITED STATES PATENTS
| 2,857,657 | 10/1958 | Wheeler | 29/156.8 |
| 3,029,910 | 4/1962 | Kirk et al. | 29/191 |
| 3,138,009 | 6/1964 | McCreight | 75/222 X |
| 3,285,714 | 11/1966 | Davies et al. | 29/182.1 |

*Primary Examiner*—Carl D. Quarforth
*Assistant Examiner*—Brooks H. Hunt
*Attorneys*—G. N. Shampo and Paul Fitzpatrick ABSTRACT: A sheet material of a controlled porous characteristic made up of two or more metal laminae bonded together, the laminae being photo etched or otherwise machined to define pores through the laminae and also passages between the abutting faces of the laminae. The passages may be spaces between bosses on the laminae or grooves in the faces of the laminae. The sheet may be formed into a turbine blade facing or other hot part of a gas turbine. In the case of a blade facing, the leading edge may have pores for direct discharge of film cooling air. The permeability to fluid flow may be varied over the area of the sheet.

PATENTED JUN 15 1971

INVENTORS
George B. McGinnis,
BY & Nick F. Bratkovich

Paul Fitzpatrick
ATTORNEY

PATENTED JUN 15 1971

INVENTORS
George B. Meginnis,
BY & Nick F. Bratkovich

Paul Fitzpatrick
ATTORNEY

INVENTORS
George B. McGinnis,
BY & Nick F. Brathovich
Paul Fitzpatrick
ATTORNEY

3,584,972

LAMINATED POROUS METAL

Our invention is directed to providing metal parts adapted to withstand very high temperatures. It is concerned particularly with improvement of gas turbine engines by use of materials better adapted for cooling and for resistance to high-temperature gases than materials now available. Preferably, our invention is embodied in a metal sheet made up of a plurality of layers or laminae configured to provide voids or passages within the sheet for flow parallel to the face of the sheet and to provide pores or passages extending through the laminae of the sheet and disposed out of register, so that the composite structure provides a tortuous path for flow of air or other cooling fluid through the sheet.

Because of the intended use of this material in extremely hot environments, it is particularly concerned with laminates of metals having exceptionally good resistance to high-temperature gas flows. However, the principles of the invention may also be useful by making it possible to use much less highly resistant metals in environments where only the highest temperature resistant alloys now available can be used without the benefits of our invention, or generally in cooling metals to resist otherwise destructive temperatures.

Another aspect of our invention is that it makes possible the provision of a thin porous sheet having voids distributed in it so that the resulting structure is substantially stronger than prior art porous sheets of the same permeability. Thus, in addition to the provision of through passages for transpiration cooling and the like, our invention makes possible thin sheets of cellular structure having improved relation of strength to weight as compared to other porous structures.

While the primary application of the principles of our invention appears to be to sheet metal structures of thickness of the order of 10 to 50 mils (herein used to mean thousandths of an inch), it should be understood that our lamination process can be employed with heavier laminae or with relatively large numbers of thin laminae to provide metal bodies of greater thickness.

To sum it up, in the aspect which presently seems most significant, our invention is embodied in a porous metal sheet of a corrosion and heat resistant alloy having such controlled porosity that it is particularly adapted for effusion cooling and having structural characteristics that make it suitable for use as turbine blades or as less highly stressed high temperature components of gas turbines such as turbine vanes, combustion liners, and exhaust duct elements.

The principal objects of our invention are to improve the efficiency and reliability of gas turbine and other heat engines and to provide a refractory metal sheet of controlled porosity particularly adapted for cooling to resist extreme high-temperature environments.

The nature of our invention will be apparent from the succeeding detailed description of preferred embodiments thereof and the accompanying drawings.

FIG. 1 is a schematic illustration of a turbojet engine to show parts which are subject to particularly high temperatures.

FIGS. 2, 3, and 4 are views of a metal lamina, FIGS. 2 and 4 being views of the opposite faces and FIG. 3 being a cross section.

Figure 8:
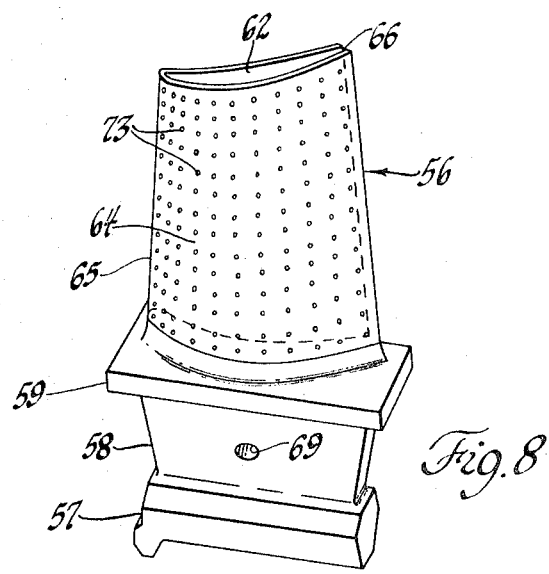
FIG. 8 is a similar view of the completed blade.
Figure 9:
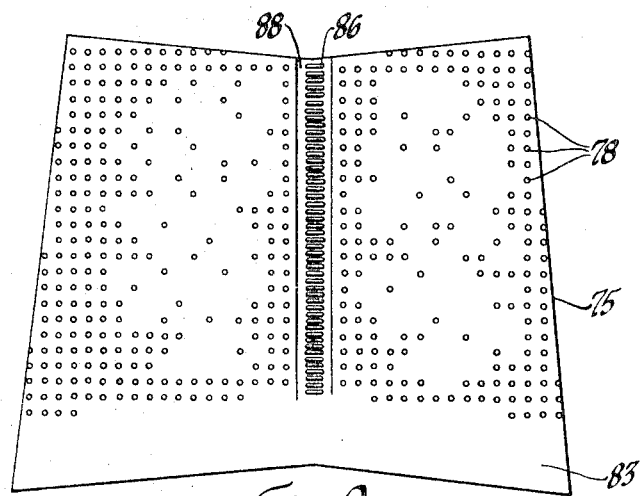
Figure 10:
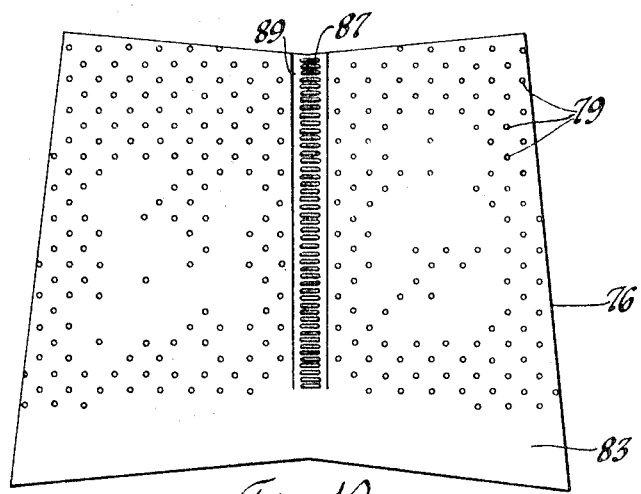
Figure 11:
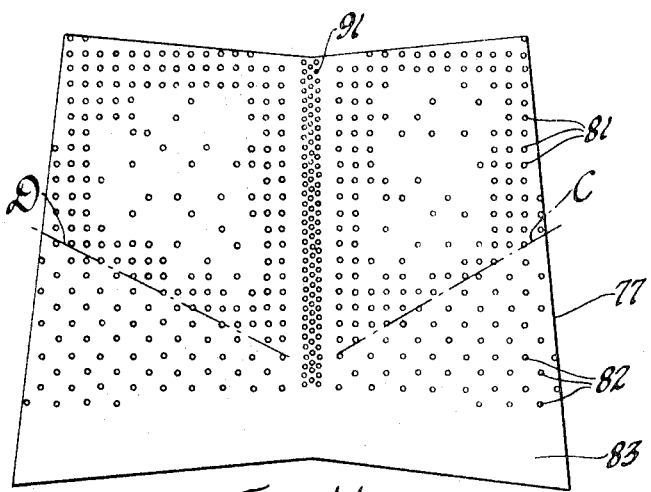

FIGS. 9, 10, and 11 show, respectively, the inner, the intermediate, and the outer layers of a three-layer sheet material particularly suited for a turbine blade such as that shown in FIG. 8.

Figure 12:
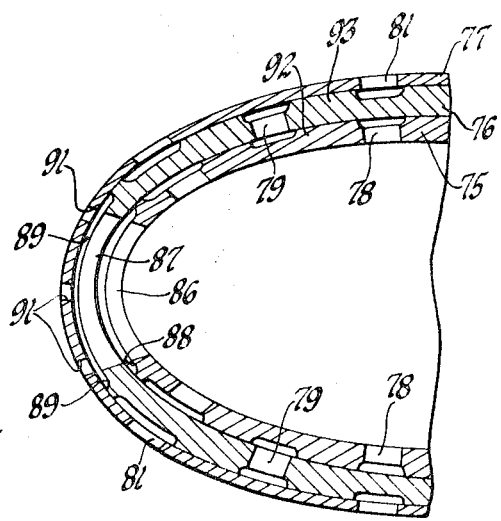

FIG. 12 is a cross section through the leading edge of a blade formed of a sheet according to FIGS. 9, 10, and 11.

Figure 13:
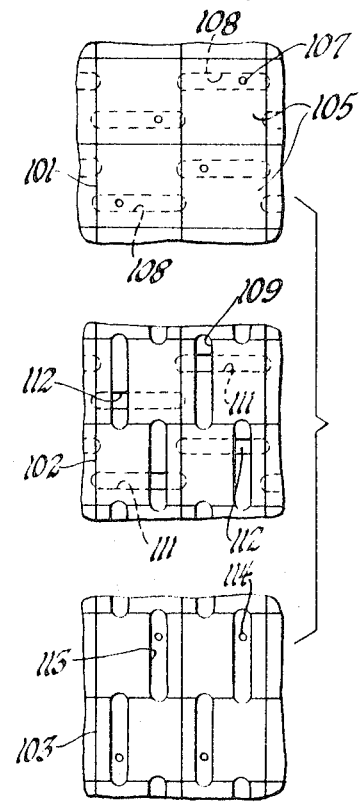

FIG. 13 is a more or less schematic illustration of a still further variety of laminated structure.

Figure 1:
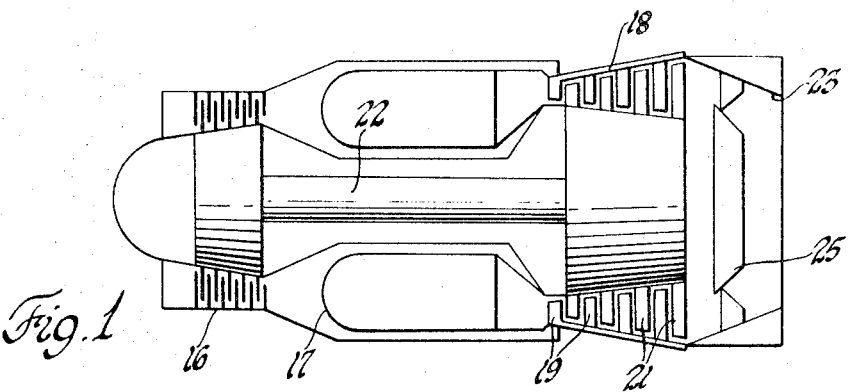

Referring first to FIG. 1, a typical turbojet engine is illustrated schematically. The engine includes an axial flow compressor 16, combustion apparatus including combustion liners 17 with transition sections, and a turbine 18. The turbine includes stator vanes 19 and rotor blades 21. A shaft 22 couples the turbine to the compressor. A duct 23 carries the exhaust from the turbine and an afterburner 25 may be installed in the exhaust duct. In such an engine, the combustion liners and transition sections, turbine vanes with their shrouds, turbine blades, and the structures in the exhaust duct are all at relatively high temperatures, ordinarily around 1,200° to 1,800° F. The temperature decreases progressively through the turbine so that the combustion liners or first stage turbine nozzle may be the hottest part of the engine. However, the first stage turbine blades are in almost as hot an environment as the nozzle and additionally are subject to centrifugal stresses.

It has long been known that the efficiency of a gas turbine is largely dependent upon the temperature of the motive fluid, with the result that great effort has been put into creation of alloys capable of withstanding very high temperatures and of suitable mechanical strength and corrosion resistance to serve as parts in gas turbines. Also, for decades efforts have been put into schemes to cool the critical parts of the engine so that they can tolerate hotter motive fluid than would otherwise be possible. However, this cooling is not a simple problem, particularly since it ordinarily involves diversion of air from the compressor. Bleeding one percent of the air compressed by the engine reduces the engine output roughly by 3 percent, assuming other factors remain constant. Therefore, it is important that as small an amount of cooling air be used as possible, and that it be used most effectively.

In the present state of the art, it appears that the most efficient way to use cooling air is transpiration cooling in which the air diffuses through a porous material. The next most efficient cooling method is film cooling, in which a film of cool air is caused to flow over a structure so as to shield it from the very hot combustion products. Our invention is particularly directed toward transpiration cooling, but also is adaptable to the addition of film cooling so that a very efficient combination of transpiration cooling and film cooling may be employed.

A relatively brief exposition of the general considerations and state of the art referred to above may be found in the American Society of Mechanical Engineers paper 65–WA/GTP10, "Analysis and Testing of Air-Cooled Turbine Rotor and Stator Blades" by H.E. Helms and C.W. Emmerson, presented in Nov., 1965.

In most gas turbines, the hot parts of the combustion apparatus and of the exhaust duct are made of sheet metal. The structures which define the flow path through the turbine, such as vanes and blades, are typically forged or cast but may have a facing or airfoil surface constituted by formed sheet metal. Sheet metal may also be used without internal support if suitable end mountings are provided.

Thus, the porous sheet metal of our invention is readily adaptable for use in such gas turbine components. However, it should be noted that material for blades must be strong to resist the centrifugal force and gas loads and must be sufficiently pliable or ductile to permit the forming of leading edge radii. Of course, it must also resist high-temperature gas containing oxygen.

Efforts have been made to provide porous high-temperature materials by sintering layers of wire, mesh, or ribbon. Examples of disclosures related to this type of activity are found in U.S. Pat. Nos. 2,857,657, 3,011,760, 3,067,982, and 3,095,283. However, these prior art efforts have not provided good control of porosity or high tensile strength and modulus of elasticity. As will be seen from the succeeding description, our porous material is much different from those shown in these patents.

For purposes of description, the metal sheet according to our invention comprises an outer lamina exposed to the high temperature, an intermediate lamina, and an inner lamina. These laminae ordinarily are rather thin sheet metal, from 5 to 20 mils. The outer lamina has numerous small holes of diameter approximately equal to the thickness of the lamina distributed more or less uniformly over its surface. The inner sheet may be similar to the outer sheet. The intermediate sheet also has holes or pores extending through the sheet but, in addition, has its surface modified to provide distributed bosses or ribs on the surface so that controlled passages for flow of air transverse to the direction through the lamina are provided. Alternatively, the grooves or bosses may be provided on the inner surface of the outer lamina, or the outer surface of the inner lamina, or any other arrangement may be made such that one of the two abutting faces at each interface is relieved, or both are relieved, so as to provide for transverse conduction of fluid through the material.

Figure 6:
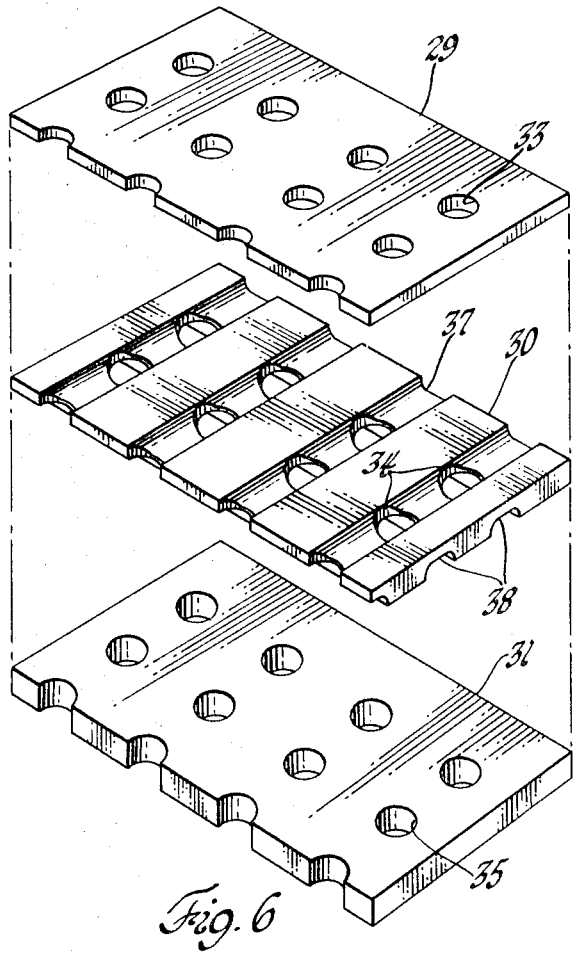
FIG. 6 is an exploded axonometric view of a sheet composed of three laminae of a configuration distinct from those of the preceding figures.

This is apparent more particularly from consideration of FIG. 6 in which the outer lamina 29, the intermediate lamina 30, and the inner lamina 31 are illustrated. In one illustrative embodiment, lamina 29 has been 5 mils thick and the other two laminae 10 mils thick. Through holes or pores 33, 34, and 35 in the respective laminae are of the order of 5 to 10 mils in diameter. The outer and inner sheets have flat faces. The intermediate sheet is provided with parallel grooves 37 on its outer face and 38 on its inner face, the grooves on each face being at a right angle to those on the other face. The holes and grooves in the layers can be produced by photoetching or electrochemical machining. Grooves 37 and 38 may be etched to a depth of 6 mils, thus cutting into each other to define the pores 34. A composite sheet is made from the three layers shown in FIG. 6 by abutting the layers and bonding them together. The layers are so stacked that the pores 33, 34, and 35 are out of alignment with each other. For example, holes 35 may be roughly halfway between holes 34 and these roughly halfway between holes 33. Thus, air supplied to the sheet from its inner face can flow through holes 35, along grooves 38, through holes 34, along grooves 37, and out through holes 33 to the face of the sheet. Air flowing through the grooves within the material and out these multitudinous pores can strongly cool the material. The spacing between the pores in each sheet in such a case might ordinarily vary from about 30 to about 50 mils.

Figures 2, 3, 4:
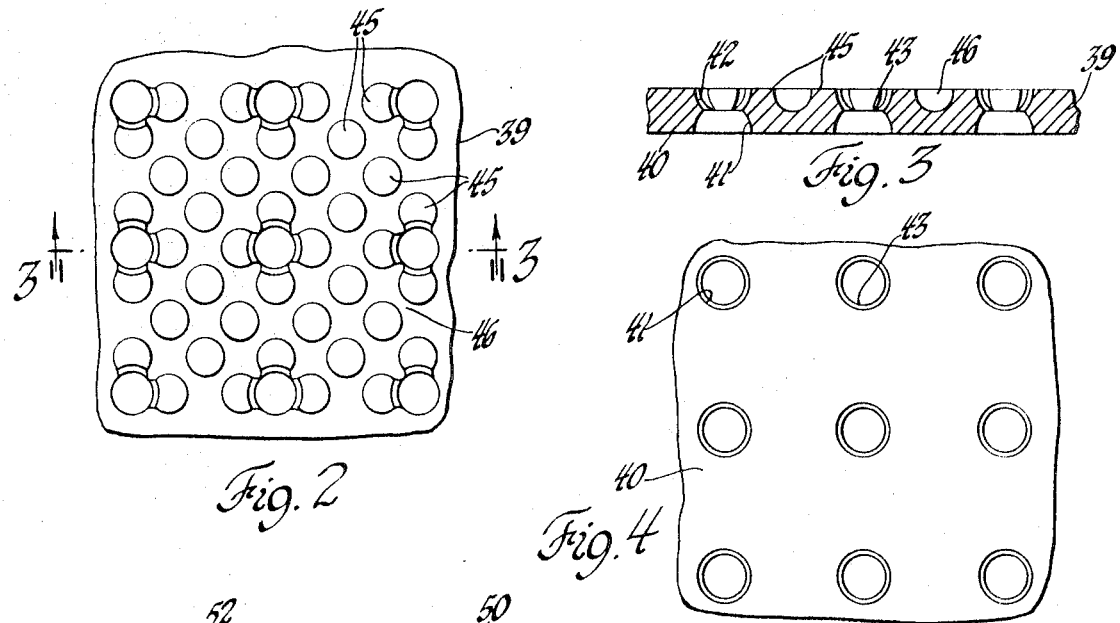

FIGS. 3, 3, and 4 show a form of lamina which is regarded favorably and illustrate a type of hole and boss pattern which also might result from the use of photoetching or chemical etching techniques in the manufacture of the sheet. Starting with a metal sheet 39 of suitable gauge, the material is etched from one side to provide pits 41 and from the other side to provide pits 42 which register with pits 41 and join with them to provide the pores or through passages 43 distributed over the lamina. One surface of the lamina is additionally etched to leave a number of closely spaced circular projections or lands 45 providing a grid of passages through the voids 46 between the lands. The structure illustrated had an overall thickness of 10 mils with lands of 6 to 9 mils diameter and pores 11 to 15 mils surface diameter spaced about 32 mils, in a particular example. A lamina as illustrated in FIGS. 2 to 4 could be the intermediate lamina or could be a face laminae. If it is one of the face laminae, the plane face 40 would be exposed.

When two laminae having bosses such as 45 are stacked, the bosses are aligned so that any force applied to the composite sheet in forming it can be transmitted directly through solid metal. However, as in the previous example, the pores such as 43 in the successive laminae are offset. Proper alignment can be assured by register holes in the margins of the laminae.

Figure 5:
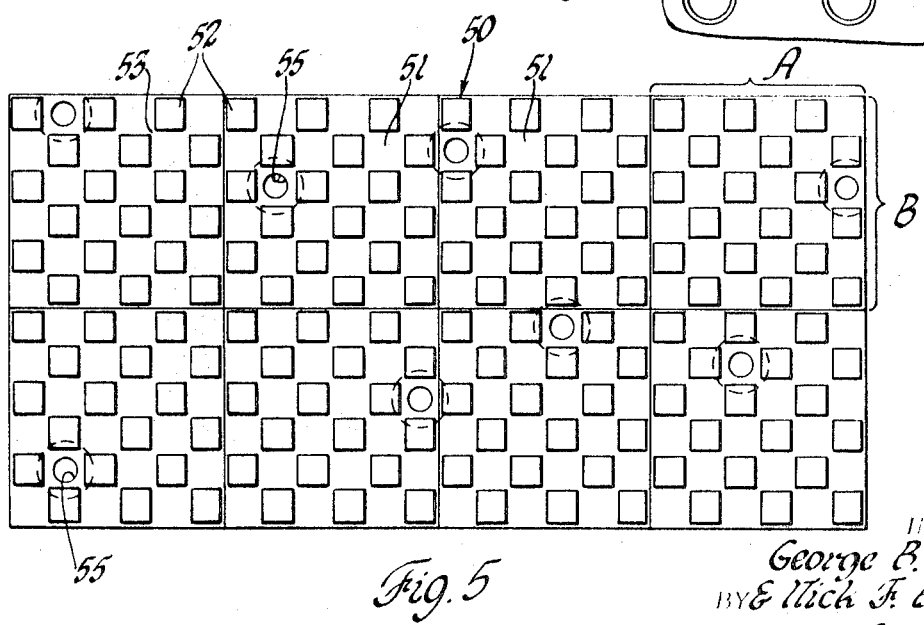
FIG. 5 is a view of a lamina of different configuration.

A further useful principle or feature applicable to the porous material is illustrated by FIG. 5, which is a plan view of a lamina of the same general type as that of FIGS. 2 to 4. The principal difference lies in a controlled random distribution of the pores. The lamina 50 of FIG. 5 is laid out according to a grid pattern in which a square as indicated by the brackets A and B, or other modular area, is one unit of a grid. Eight such units, which may be identified as squares 51, are indicated in the figure. Each unit 51 bears six rows of lands or projections 52 in each direction, the bosses being in a checkerboard pattern so there are, in this instance, 18 lands in each unit. Gaps 53 between the lands provide for lateral or transverse airflow. The pores or through holes such as indicated at 55 are not in the same location in each unit but instead are arranged in a random pattern, so that while there is one pore for each unit of area, the pores are not in the same position in each unit. This controlled random pattern has an interesting and useful result in that, when layers having the random pattern of holes are laid one upon the other, it is no longer necessary to register the layers very carefully. With the uniform or regular hole pattern as in FIGS. 2 to 4, an error in the registration of the layers could cause all of the pores in the several layers to be aligned and thus could create holes straight through the composite sheet, thus eliminating the transverse flow through the sheet and also greatly increasing the permeability of the sheet. The result would be less effective cooling and considerably greater use of cooling fluid. With the layers in which the holes are disposed randomly in control unit areas, there is no possibility of aligning more than an occasional pair of holes with each other. Thus, the registration problem is no longer acute. It should be understood that the unit area corresponding to one pore can vary over the total area, or the size of the pores can vary, to vary permeability at different areas.

An important parameter of our porous material is its permeability to flow, which may be expressed as weight of airflow through unit area of the sheet under unit pressure differential. In any case, it is desired to flow through the sheet the exact amount of air or other fluid which will provide, through effusion or film effects, the required amount of cooling. It is undesirable to resort to high pressures to force the fluid, and ordinarily in a gas turbine air is used at compressor discharge pressure. Depending upon the pressure at the exterior of the blade or other cooled part, the flow to the blade may be controlled by controlling the permeability of any area of the sheet, which will be a function of the sizes and spacings of the pores in the several layers and of the characteristics of the flow passages parallel to the face of the sheet between the pores. Clearly, the amount of flow for a given pressure can be widely varied by varying such constants of the sheet. Also, it is a relatively simple matter to prepare a sheet of varying permeability or flow characteristics at different areas to accord with differing requirements for cooling. For example, in an uncooled turbine blade the leading edge and the pressure side of the blade are quite hot and the suction side is appreciably cooler than the pressure side. Also, for example, in a turbine it might be desirable to provide a greater airflow for cooling first stage blades than second stage ones. Some areas of a combustion liner are heated much more than other areas. In many other cases the need for cooling is a function of the coordinates of the point.

Figure 7:
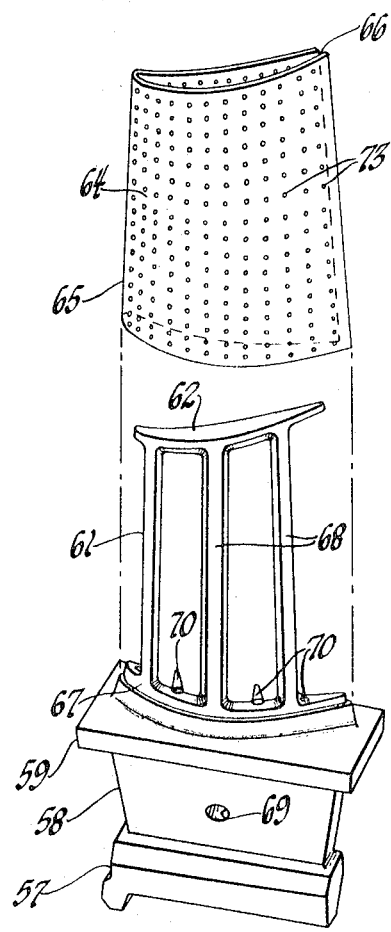
FIG. 7 is an exploded view of a turbine blade embodying our invention.

One mode of applying a permeable sheet according to the invention to a turbine blade is illustrated in FIGS. 7 and 8, in which FIG. 7 shows the two parts of the blade in exploded relation and FIG. 8 shows the completed blade. The exemplary blade 56 includes a root 57, a stalk 58, a platform 59, and a core 61 terminating in an end cap 62. The blade also includes a facing 64 which is a sheet of our permeable material formed and folded to a suitable airfoil contour with a leading edge 65 and a trailing edge at 66. The facing may be electron beam welded or otherwise fixed to the core at the margins of the cap 62, around the boss 67 extending from the platform, and also along ribs 68 of the core. Cooling air may be supplied to the blade through an opening 69 in the stalk which is connected to openings such as 70 feeding air to the spaces between the core 61 and the facing. This air then passes through the offset pores and transverse passages in the facing and flows from the blade through the multifarious pores 73 in the outer layer of the facing.

FIGS. 9 through 12 illustrate a further refinement of the principles of the invention as applied to a turbine blade. FIGS. 9, 10, and 11 illustrate respectively the inner layer 75, the intermediate layer 76, and the outer layer 77. The inner layer has spaced pores 78, intermediate layer 76 has pores 79, and the outer sheet has pores 81. Pore spacing in the layers is selected to give a desired airflow path. The outer faces of both layers 76 and 76 have a pattern of lands which may be similar to the pattern of lands 45 shown in FIG. 2 or 55 shown in FIG. 5. The scale of FIGS. 9 and 10 does not permit a showing of this pattern which provides the transverse passages between layers 75 and 76 and between layers 76 and 77. It may be noted further that the outer layer 77 is divided into an outer zone and an inner zone along the line of demarcation indicated by the broken lines C and D in FIG. 11. The pores 82 in the lower portion as illustrated, which is the portion of the blade face nearest the root when the blade is fabricated, are more widely spaced than the pores 81 in the upper portion. The laminae 75, 76, and 77 are bonded together and are folded as indicated in FIGS. 7 and 8. The resulting facing may be mounted on a base or support such as that illustrated in FIG. 7 or any other suitable support. In mounting the facing, the imperforate base portion 83 extending across the base of the strip is utilized for welding or other attachment to the support to mount the blade facing. It will be seen, therefore, that the blade facing is provided with areas of differential porosity, in this case by the variation in the spacing of the pores. A variation in the etching between pores resulting in a greater permeability to the transverse flow could also vary the cooling effect.

A further feature of the structure shown in FIGS. 9 to 12 is a special arrangement at the leading edge to provide for film cooling by a large flow of air from the leading edge of the blade. In this connection, the sheets 75 and 76 have through slots 86 and 87 distributed in a row in a trough 88 or 89 along the position of the fold to form the leading edge. The outer lamina 77 is provided with three rows of very small holes 91 at the same area. When the three layers are bonded together, the small holes 88 overlie the relatively large slots 86 and 87 and troughs 88 and 89. Thus, air supplied to the inside of the blade flows through the two inner sheets and out the small holes 88 in the leading edge of the outer layer of the blade facing. This air is carried rearward over the face of the blade by the motive fluid to provide a layer of air for film cooling the blade. In addition, air supplied to the interior of the blade flows through passages 78, around lands 92 on the inner layer 75, through pores 79, around lands 93 on the outer surface of layer 76, and through pores 81 in the outer layer 77.

The structure at the leading edge just described is advantageous also from the standpoint that relatively small leading edge radii may be formed without detrimental distortion and closing of the pores and passages.

Still another configuration of the permeable sheet is illustrated in FIG. 13. Here the outer layer is represented as 101, the intermediate layer 102, and the inner layer 103. The material is laid out on the basis of modular squares such as 105 and the etching of the metal is on a random basis generally within the modular areas along the line of that described with respect to FIG. 5. However, in this case, the outer layer 101 has pores 107 in its outer surface and grooves 108 in the inner surface which register with the pores. The intermediate layer 102 has grooves 109 in its outer surface and 111 in its inner surface, these intersecting to provide pores 112. As will be apparent, layer 102 is thus similar to layer 30 of FIG. 6 except for the modular arrangement with random location of the grooves within the modular areas. The inner layer 103 is provided with grooves 113 on its outer surface which are supplied through pores 114 from the face of the layer. Note that grooves 108 and 111 are oriented in one direction whereas grooves 109 and 113 are oriented transversely to these. Location of all the grooves and holes is randomized. It may be noted that groove length, spacing and module dimension will be selected to insure intersection of the grooves.

The various examples of configurations of our permeable sheet material described above are sufficient to illustrate the underlying principles and the adaptability of the material to various conditions.

It should be mentioned that the material is usable for cooling by liquids or for other purposes in which a material permeable to liquids is needed, although the primary emphasis in the work on the material so far has been with the application to air cooling. Also, the principles of the invention are applicable to metals which are not inherently high-temperature resistant, but again the primary emphasis has been on increasing the temperature range of high-temperature resistant metals rather than equaling the temperature range of such metals with those of lower melting points.

So far as the fabrication of the composite sheet is concerned, various techniques and processes may be employed and the feasibility and the usability of such processes and the details of the procedure employed will necessarily vary with the character of the material which is being used, as well as being a matter of choice to varying extents. The machining of the sheet stock to provide the fine pores, lands, grooves, or other elements of surface relief has been most satisfactorily done by employment of photoetching machining techniques in which the raw sheet material is cleaned, masked by a suitable pattern, ordinarily by photographic techniques, and chemically or electrochemically etched to provide the surface relief.

The joining or bonding of the layers into the laminate might be effected by any suitable brazing, cladding, or diffusion bonding techniques appropriate to the particular material. With the high-temperature alloys on which work has been done, processes of diffusion bonding have been found most suitable. The sheets after being cleaned have been lightly nickel plated and have been subjected to heat and pressure in a vacuum or a controlled atmosphere, depending upon the materials used, for a suitable time to create a diffusion bond between the layers. In this connection, the lands on the surface tend to aid in the diffusion bonding by providing nucleation points.

It may be desirable to cite some examples of the high-temperature alloys which are considered suitable for use in forming our porous material for extremely high-temperature service. Such alloys with their approximate percentage composition are tabulated below:

| Name | AMS Spec. | Cr | Co | Mo | Ti | W | Al | Fe | Ni |
|---|---|---|---|---|---|---|---|---|---|
| Hastelloy X | 5,536 | 22 | 1.5 | 9.0 | | 0.6 | | 18.5 | Base. |
| Waspaloy | 5,544 | 19.5 | 13.5 | 4.3 | 3.0 | | 1.4 | | Do. |
| René | 5,545 | 19 | 11 | 10 | 3.0 | | 1.5 | 5.0 | Do. |
| Udimet 500 | | 18 | 17 | 4 | 3 | | 3 | | Do. |
| Udimet 700 | | 15 | 8.5 | 5 | 3.4 | | 4.5 | | Do. |

Sheets of Rene 41, Hastelloy X, and Waspaloy have been found to exhibit sufficient ductility for forming into turbine vanes and blades and to withstand forming without serious effects upon the porosity of the sheet. It is, of course, possible to form the layers before bonding and thereafter bond in a suitable fixture, or to bond the flat sheet and then form.

Our invention is primarily concerned with the new type of porous material rather than the fabrication processes which, as stated, represent the application of metallurgical skill in each case to the particular metal.

Also, the selection of a suitable alloy is a matter of judgment depending upon the environment. The Rene 41 and Waspaloy considered to be particularly suitable for turbine blades and vanes; Hastelloy for combustion liners and exhaust duct parts.

It may be pointed out that a generally tubular body such as a cylindrical combustion liner or vane shroud, for example, can be formed from a single piece of metal having a suitable relieved surface and perforated body which is rolled upon itself to provide several laminae from the same continuous piece of metal stock.

Another point that may be noted is that it is not necessary that the several layers of a multilayer material be of the same composition. However, if not of the same composition, they should be of metals having compatible thermal expansion characteristics and capable of being bonded together.

It should be made clear that emphasis herein on photoetching as a means of providing the surface relief and perforations does not imply exclusion of any forming or machining techniques which may be suitable for a particular material or application.

The detailed description of preferred embodiments of our invention for the purpose of explaining the principles thereof is not to be considered as limiting or restricting the invention, since many modifications may be made by the exercise of skill in the art.

We claim:

1. A metal sheet of controlled porosity comprising
   at least two metal laminae abutting one another in face-to-face relation and bonded together at each interface between adjacent laminae,
   each lamina being provided with pores of controlled size extending through the lamina and distributed over the area of the lamina,
   the pores of adjacent laminae being out of register, and
   at least one of the two lamina faces at each interface having a surface relief defining passages of a predetermined order of magnitude interconnecting the pores in the laminae that abut at the interface.

2. A structure as defined by claim 1 in which the surface relief is provided by grooves extending generally parallelly across the face.

3. A structure as defined by claim 1 in which the surface relief is provided by mutually closely adjacent nonabutting lands arrayed on the face.

4. A structure as defined by claim 1 in which the pores are arrayed in a regular pattern.

5. A structure as defined by claim 1 in which the pores are arrayed in a pattern of controlled randomness.

6. A structure as defined by claim 1 in which the sheet comprises an outer, an intermediate, and an inner lamina.

7. A structure as defined by claim 6 in which the intermediate lamina bears grooves extending generally parallelly across each face, the grooves on one face extending generally perpendicularly to those on the other face.

8. A structure as defined by claim 7 in which the grooves are disposed randomly in modular areas of the face.

9. A sheet as defined by claim 1 of airfoil configuration.

10. A fluid deflecting element for a fluid dynamic machine comprising a blade facing formed to define an airfoil with leading and trailing edges and two blade faces extending from the leading edge toward the trailing edge, at least one face being cambered,
    the facing being a metal sheet of controlled porosity comprising at least two metal laminae abutting one another in face-to-face relation and bonded together at each interface between adjacent laminae,
    each lamina being provided with pores of controlled size extending through the lamina and distributed over the area of the lamina,
    the pores of adjacent laminae being out of register, and
    at least one of the two lamina faces at each interface having a surface relief defining passages of a predetermined order of magnitude interconnecting the pores in the laminae that abut at the interface.

11. A structure as defined by claim 10 in which the surface relief is provided by grooves extending generally parallelly across the face.

12. A structure as defined by claim 10 in which the surface relief is provided by mutually closely adjacent nonabutting lands arrayed on the face.

13. A structure as defined by claim 10 in which the pores are arrayed in a regular pattern.

14. A structure as defined by claim 10 in which the pores are arrayed in a pattern of controlled randomness.

15. A structure as defined by claim 10 in which the number of pores per unit area is varied as between diverse zones of a lamina.

16. A structure as defined by claim 10 in which the sheet comprises an outer, an intermediate, and an inner lamina.

17. A structure as defined by claim 16 in which the intermediate lamina bears grooves extending generally parallel across each face, the grooves on one face extending generally perpendicularly to those on the other face.

18. A structure as defined by claim 10 in which passages are provided substantially directly through the leading edge to provide an exit for film cooling air.

19. A structure as defined by claim 10 in which the structure of the sheet at its leading edge is less dense than at the faces so as to facilitate folding of the sheet without detriment to its porous features.

20. A sheet as defined by claim 1 composed of a high temperature resistant alloy.

21. A structure as defined by claim 10 in which the facing is composed of a high temperature resistant alloy.

22. A sheet as defined by claim 1 forming an element bounding a path for flow of hot gas.

23. A sheet as defined by claim 1 in which the permeability of the sheet has different values at different areas of the sheet.

24. A sheet as defined by claim 23 in which the pore size of at least one lamina has different values at different areas of the sheet.

25. A sheet as defined by claim 23 in which the pore concentration of at least one lamina has different values at different areas of the sheet.

26. A sheet as defined by claim 23 in which the permeability to flow of the said passages is of different magnitude at different areas of the sheet.

27. A structure as defined by claim 10 in which the permeability of the blade facing has different values at different areas of the facing.

PO-1050
(5/69)

UNITED STATES PATENT OFFICE
CERTIFICATE OF CORRECTION

Patent No. __3,584,972__          Dated __June 15, 1971__

Inventor(s) __Nick F. Bratkovich and George B. Meginnis__

It is certified that error appears in the above-identified patent and that said Letters Patent are hereby corrected as shown below:

Column 3, line 46, "FIGS. 3, 3, and 4" should read -- FIGS. 2, 3, and 4 --.

Column 5, line 8, "layers 76 and 76" should read -- layers 76 and 75 --.

Column 6, in the tabulation, "Rene" should read -- Rene 41 --.

Signed and sealed this 15th day of February 1972.

(SEAL)
Attest:

EDWARD M. FLETCHER, JR.
Attesting Officer

ROBERT GOTTSCHALK
Commissioner of Patents